(12) United States Patent
Matsutani et al.

(10) Patent No.: US 7,741,565 B2
(45) Date of Patent: Jun. 22, 2010

(54) ELECTRONIC COMPONENT AND METHOD FOR MANUFACTURING THE SAME

(75) Inventors: Nobuya Matsutani, Osaka (JP); Michio Ohba, Osaka (JP); Toshiyuki Atsumi, Osaka (JP); Hitoshi Ishimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 11/947,219

(22) Filed: Nov. 29, 2007

(65) Prior Publication Data

US 2008/0245550 A1 Oct. 9, 2008

(30) Foreign Application Priority Data

Apr. 6, 2007 (JP) .............................. 2007-100208

(51) Int. Cl.
*H01B 5/14* (2006.01)
(52) U.S. Cl. .............................. 174/126.1; 174/117 FF
(58) Field of Classification Search ............. 174/126.1, 174/250, 117 FF
See application file for complete search history.

(56) References Cited

FOREIGN PATENT DOCUMENTS

| JP | 09-270355 | 10/1997 |
|---|---|---|
| JP | 2001-358020 | * 12/2001 |

* cited by examiner

*Primary Examiner*—Chau N Nguyen
(74) *Attorney, Agent, or Firm*—McDermott Will & Emery LLP

(57) ABSTRACT

In conventional electronic components, having a substrate as a component of the structure has been an obstacle to an ultra-low profile design. To address the problem, the present invention provides an improved structure without a substrate. Internal electrode 15 is formed into a predetermined coil pattern. Bumps 16 and irregularities 17 are formed on confronting surfaces of the component, by which each component is hard-to-cling with one another. On the other hand, the confronting side-surfaces with no bumps 16 or irregularities 17 allow a mounting device to have an improved vacuum suction force. Such structured electronic component maintains easy handling even when it is extremely downsized.

10 Claims, 8 Drawing Sheets

ELECTRONIC COMPONENT AND METHOD FOR MANUFACTURING THE SAME

CLAIM OF PRIORITY

This application claims the benefit of Japanese Patent Application No. JP 2007-100208, filed on Apr. 6, 2007 the disclosure of which is incorporated herein by reference.

FIELD OF THE INVENTION

The present invention relates to an electronic component and a method for manufacturing the same.

BACKGROUND ART

An electronic component has conventionally formed on a substrate.

Here will be described a flat coil as a conventional electronic component with reference to FIG. 9. FIG. 9 is a perspective view of a conventional flat coil. Coil-shaped or helical wiring 2 is formed on substrate 1 including an alumina substrate and is covered with protecting section 3 made of insulating resin. External electrodes 4 are connected to both ends of wiring 2. Such structured flat coil is mounted on a printed circuit board via external electrodes 4. In response to demands for downsizing electronic components, manufacturers makes some more progress on the path to miniaturization; recent technology seeks an ultra-compact structure with a dimension of 0.4 mm×0.2 mm×0.2 mm (the so-called 0402 component), as is shown by X, Y and Z in FIG. 9.

Next will be described obstacles to miniaturization of electronic components with reference to FIG. 10.

FIG. 10 shows the relationship of the dimension of a conventional electronic component, the area (mm$^2$), the weight (mg) and the ratio of the area to the weight. The x-axis represents the dimension of products that gets smaller toward the right: 3216 (3.2 mm×1.6 mm); 20125 (2.0 mm×1.25 mm); 1608 (1.6 mm×0.8 mm); 1005 (1.0 mm×0.5 mm); 0603 (0.6 mm×0.3 mm); and 0402 (0.4 mm×0.2 mm). On the other hand, the y-axis represents the following three: the area of a product (specifically, it shows the total area (mm$^2$) of the six faces that is shown by a graph with a combination of dotted lines and 'o' in FIG. 10); the weight of the product (specifically, it shows the weight (mg) when the product has a density of 1 g/cc that is shown by a graph with a combination of dash-single-dot lines and '◊'); and the ratio of the area to the weight shown by a graph with a combination of solid lines and 'Δ'). It will be understood that the graph showing the ratio of the area to the weight has a sharp rise as the product is getting smaller. Such an extremely downsized electronic component, since it is mainly made of insulating resin, is susceptible to static electricity. This will be easily understood by an example where a minute plastic powder (of less than 1 mm in diameter) exhibits high adherability under the influence of static electricity.

Compared to the electronic component mainly made of resin, a ceramic-based electronic component, such as a laminated ceramic capacitor, has larger specific gravity ranging from 3 to 10, which protects the component from the influence of static electricity. Similarly, a square chip resistor and the flat coil shown in FIG. 9 have a substrate as a main structure. By virtue of the weight of the substrate, the two components above are less susceptible to the influence of static electricity.

In contrast, resin-based electronic components, because of a small specific gravity of approx. 1, have a lightweight structure. Besides, the shapes of the components have little difference in density and specific gravity in the vertical and the horizontal directions. That is, the smaller the chip size, the more susceptible to the influence of static electricity. The susceptibility to static electricity causes poor handling of each electronic component. Therefore, manufacturers are having difficulties in retrieving a necessary component from a magazine case containing various components.

For example, Japanese Patent Unexamined Publication No. H09-270355 is known as a prior art relating to the present invention.

As for the electronic components having resin as a main component and therefore having a small specific gravity, the smaller the size, the more increase the area of each component. This allows the miniaturized component to increase the tendency of clinging under the influence of static electricity. For example, when the 1005-component and the 0603-component make contact with each face, it is difficult to separate one from the other. In some cases, an excessive force applied to separate them can impair the characteristics or reliability of the components. From this reason, improvement in handleability has been a pending problem.

SUMMARY OF THE INVENTION

The present invention addresses the problem above. It is therefore the object of the present invention to provide an electronic component with ease of handling even when it is miniaturized and also provide a method for manufacturing the component.

The electronic component of the present invention has one or more external electrodes, a resin section that is made of a photoresist and is disposed between the external electrodes, and an internal electrode covered with the resin section. The resin section has a plurality of bumps on at least one surface or confronting two surfaces of the resin section. The bumps have a height ranging from 1 μm to 10 μm. Forming a surface with bumps facilitates an easy separation when a component clings to other ones under the influence of static electricity.

The easy separation can be obtained by bumps formed on one surface, confronting two surfaces or any given two surfaces of the six surfaces of an electronic component (that is usually formed into a rectangular solid or a hexahedron structure). By virtue of the bumps, a surface contact is changed to a point contact.

The present invention improves easy handling of micro-miniaturized structures, such as 1005- and 0603-components. If some components cling to each other, the structure of the present invention facilitates easy separation of the components. As a result, mounting efficiency with the use of an electronic-component mounting device will be vastly improved.

DETAILED DESCRIPTION OF THE INVENTION

The exemplary embodiments of the present invention are described hereinafter with reference to the accompanying drawings. In particular, the description will be focused on the dimension of the electronic components and a method for manufacturing the components.

First Exemplary Embodiment

Figure 1A:
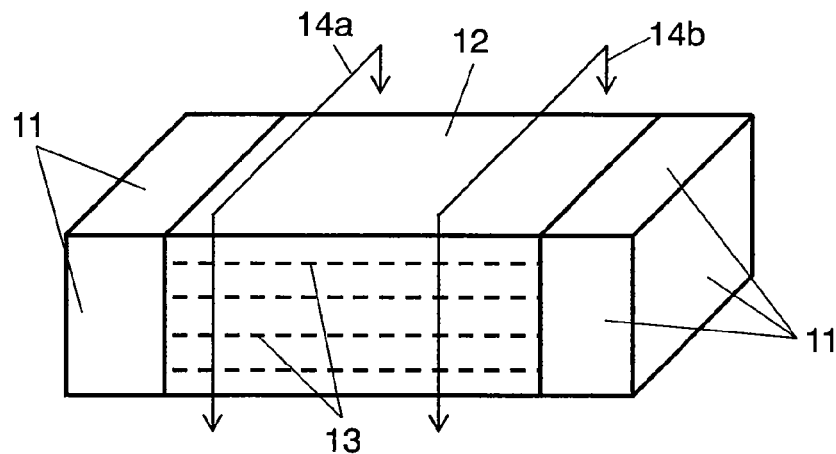
FIG. 1A is an external view of an electronic component in accordance with a first exemplary embodiment of the present invention.
Figure 1B:
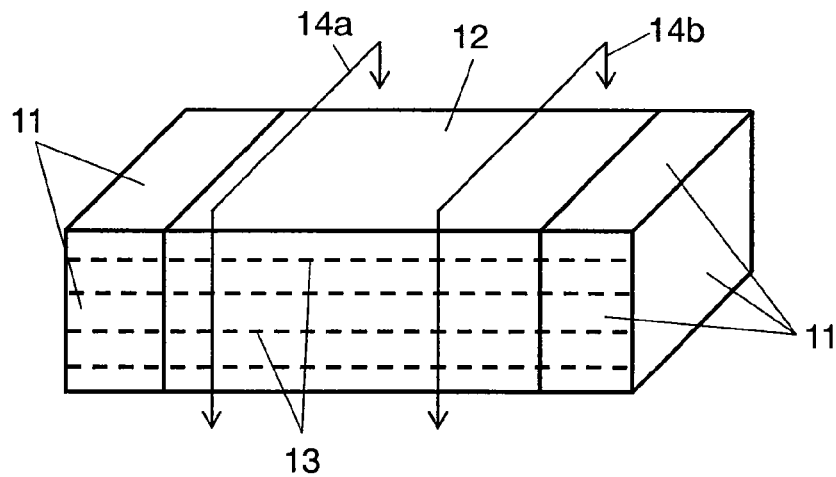
FIG. 1B is an external view of another structure of the electronic component in accordance with the first exemplary embodiment.
Figure 1C:
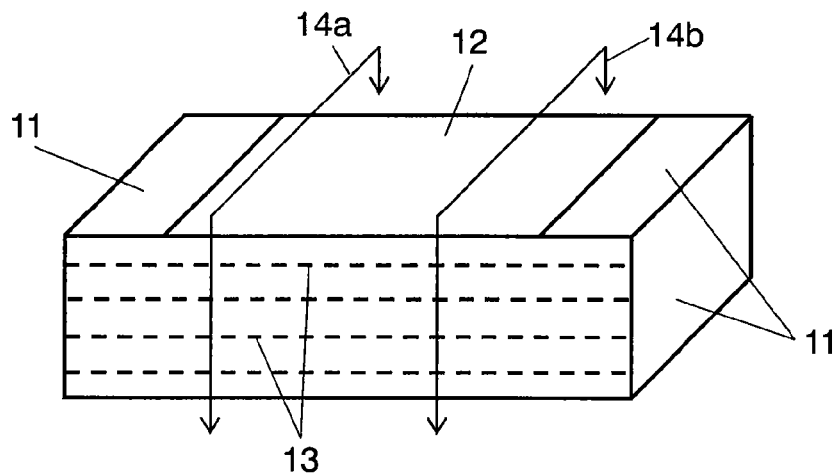
FIG. 1C is an external view of still another structure of the electronic component in accordance with the first exemplary embodiment.

Each of FIGS. 1A through 1C is an external view of an electronic component of the embodiment. FIGS. 1A through 1C show that the electronic component has external electrode 11 and resin section 12. Dotted lines 13 schematically show irregularities, or bumps formed on at least one surface of the electronic component. A detailed description on the irregularities shown by dotted lines 13 will be given later with reference to FIG. 2.

Each of FIGS. 1A and 1B is an external view of a structure where single external electrode 11 is disposed on five surfaces—except for the bottom surface—of the six surfaces of an electronic component. Such structured electrode is hereinafter referred to as a five-surface-electrode. In FIG. 1C, single electrode 11 is disposed on the three surfaces: the top, the left side, and the right side (hereinafter, a three-surface-electrode). The components of FIGS. 1A and 1B are different in the following point; the irregularities or bumps shown by dotted lines 13 are not formed on external electrode 11 (see FIG. 1A), whereas the irregularities or the bumps are formed on external electrode 11 (see FIG. 1B).

Next will be described the structure of the side surfaces of the electronic component in accordance with the first exemplary embodiment with reference to FIG. 2.

Figure 2:
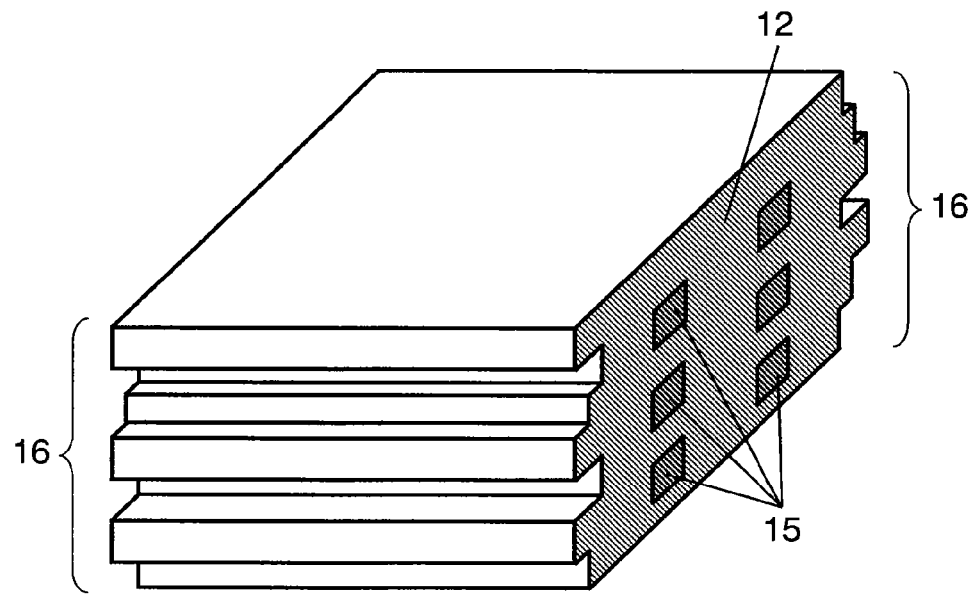
FIG. 2 is a perspective view with partial cutaway of the electronic component.

FIG. 2 is a perspective view with a partial cutaway of the electronic component of the embodiment. The crosshatched area shows the section taken along arrows 14a and 14b shown in FIGS. 1A through 1C. The electronic component of FIG. 2 has internal electrode 15 and bumps 16. Bumps 16 in FIG. 2 are formed on at least one surface of resin section 12 that surrounds internal electrode 15. The bumps, or irregularities are formed on a surface so as to have a height ranging from 1 µm to 10 µm; preferably, from 2 µm to 8 µm. The total height of the bumps on the confronting two sides on the left and the right is determined to have a range from 2 µm to 20 µm.

If the bumps have a height smaller than 1 µm, prevention against clinging of components can be impaired. In addition, such a height smaller than 1 µm may go beyond resolution in the photolithography process. On the other hand, the bumps with a height greater than 10 µm can be an obstacle to downsizing of the component. At the same time, forming the height greater than 10 µm creates a need for internal electrode 15 to be smaller; the characteristics of the electrode can be impaired.

The thickness of each bump shown in FIG. 2 equals to the thickness of each layer of a photoresist pattern (that will be described later). Preferably, each bump has a thickness ranging from 5 µm to 50 µm. If the thickness is smaller than 5 µm, the cost of the component can be increased; on the other hand, if the thickness is greater than 50 µm, reliability of prevention against clinging of components can be impaired.

The electronic component of the first exemplary embodiment, as is shown in FIG. 2, has bumps 16 on at least one surface or confronting two surfaces of the component that is usually formed into a rectangular solid or a hexahedron structure. As is shown in FIG. 1, external electrodes 11 occupy two surfaces in the rest four or five surfaces. Besides, it is preferable that the top surface should be formed into flat (that is, with no bumps) so as to provide easy mounting operations by the mounting device. Similarly, the bottom surface should be formed into flat (with no bumps) because that the surface makes contact with the printed circuit board.

Forming bumps 16 or irregularities 17 on one surface or confronting two surfaces allows the electronic component to make contact with the mounting device through a point contact, instead of a surface contact. Therefore, such structured components can be easily taken out as an individual piece or easily removed from the mounting device. As a result, damage to the electronic components that can occur in the manufacturing process can be minimized.

Figure 3:
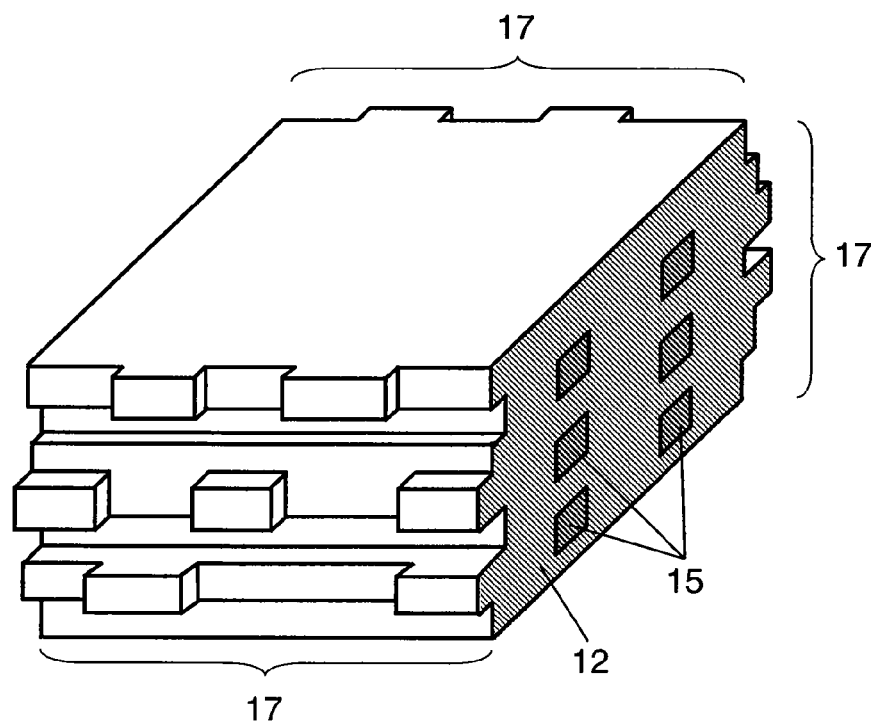
FIG. 3 is a perspective view showing another structure with partial cutaway of the electronic component.

FIG. 3 is a perspective view with a partial cutaway of another structure of the electronic component of the embodiment. The crosshatched area shows the section taken along arrows 14a and 14b shown in FIGS. 1A through 1C. The electronic component of FIG. 3 has irregularities 17 different from bumps 16 of the aforementioned component. Irregularities 17 are formed on at least one side-surface of resin section 12 that covers internal electrode 15 therein. The height of irregularities 17 should range from 1 μm to 10 μm; preferably, from 2 μm to 8 μm. If the height is smaller than 1 μm, reliability of prevention against clinging of components can be impaired; on the other hand, forming the height greater than 10 μm creates a need for internal electrode 15 to be smaller; the characteristics of the electrode can be impaired.

The thickness of each irregularity shown in FIG. 3 equals to the thickness of each layer of a photoresist pattern (that will be described later). Preferably, each irregularity has a thickness ranging from 5 μm to 50 μm. If the thickness is smaller than 5 μm, the cost of the component can be increased; on the other hand, if the thickness is greater than 50 μm, reliability of prevention against clinging of components can be impaired.

Bumps 16 and irregularities 17 differ from each other in the following point; bumps 16 function as bumps selectively formed in one direction, whereas irregularities 17 function as irregularities formed in more-than-one directions. From a practical point of view, a rigid distinction does not need between them. That is, FIG. 2 and FIG. 3 show extreme cases where the one is the component having bumps 16 disposed on at least one surface and the other is the component having irregularities 17 disposed on at least one surface. A practical structure may be between these extremes or combination of them, such as a structure having bumps or irregularities with different height in one or more directions, and a structure having bumps or irregularities with different pitch.

That is, the surface shown by dotted lines 13 of FIG. 1 may be formed into various shapes: bumps 16, irregularities 17, an "in-between" structure, or combination of them.

As described above, forming bumps 16 and irregularities 17 intentionally on at least one surface or confronting two surfaces of resin section 12 enhances the handleability of an electronic component. That is, if microminiaturized components smaller than 1005 in size, such as 0603, 0402, cling with each other by static electricity, they are resistant to have surface contact by virtue of the bumps or irregularities.

As for the rest surfaces other than those having bumps or irregularities, at-least-one surface or confronting two surfaces should preferably be flat with no bumps 16 or irregularities 17. Having no bumps or irregularities on some of the rest surfaces allows the mounting device to maintain a sufficient suction force when the component is processed by vacuum chuck of the device. In other words, bumps 16 or irregularities 17 formed on a surface to be processed by vacuum chuck have an undesired effect on the handleability of the component in the manufacturing process. Similarly, if the surface opposite to a surface processed by vacuum chuck (, that is, the surface that makes contact with the printed circuit board) has bumps 16 or irregularities 17, desirable mounting condition cannot be expected.

According to the electronic component of the embodiment, forming bumps 16 and irregularities 17 on at least one surface allows the component to hard-to-cling to other components; at the same time, forming no bumps or irregularities on at least one surface of the rest surfaces enhances efficiency in the mounting process. In this way, an excellent handleability of the component can be obtained by varying the structure of a side surface on which at least external electrodes 11 are not disposed.

Photosensitive resin is preferably employed for resin section 12 for easy formation of bumps 16 and irregularities 17 on at least one side-surface. The use of photosensitive resin offers a high degree of flexibility in shape, height and pitch of bumps 16 and irregularities 17 suitable for the shape, the uses and specific gravity of a component. Providing the surfaces with two- or three-dimensional bumps 16 and irregularities 17 further enhances easy handling and easy mounting of downsized components.

Conventionally, barrel polishing has often been used for forming irregularities 17 on at least one side-surface of an electronic component. However, such a method cannot determine a proper size or shape of irregularities 17. Besides, barrel polishing may not be an appropriate method to process the electronic components in recent years, which are becoming increasingly smaller and lighter. In addition, manufacturers are having difficulties with the barrel polishing in separating an electronic component from foreign matter or debris of a polishing agent after polishing, which has caused damage to a component in some cases. As another problem, an electronic component after barrel polishing tends to be rounder in the outside shape, particularly, in corners. As a result, the component formed into an oval ball shape, like grains of sesame and rice, can offer poor mounting condition.

Figure 4A:
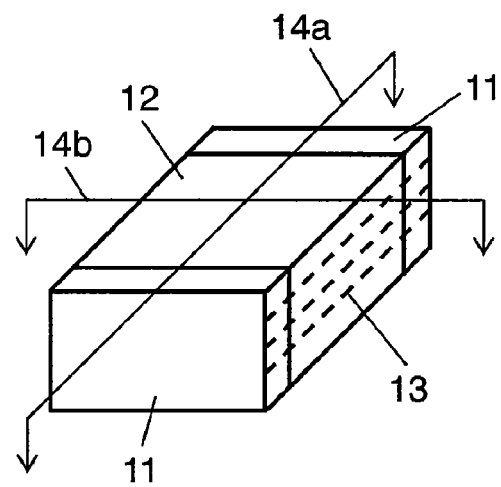
FIG. 4A is a perspective view showing a structure of the electronic component in accordance with the first exemplary embodiment.
Figure 4B:
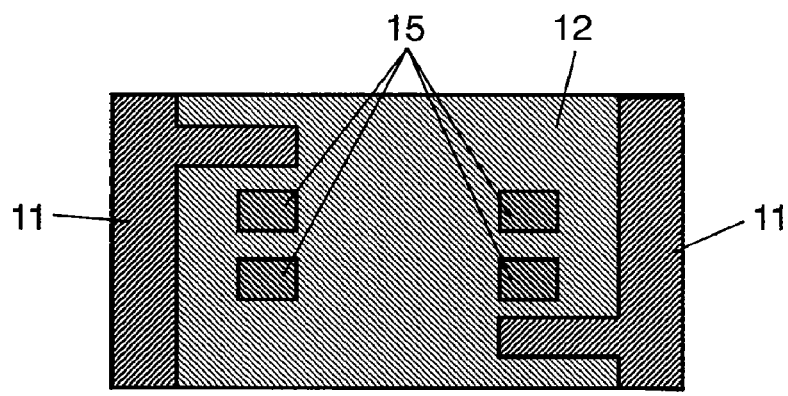
FIG. 4B is a section view taken along arrow 14a in FIG. 4A.
Figure 4C:
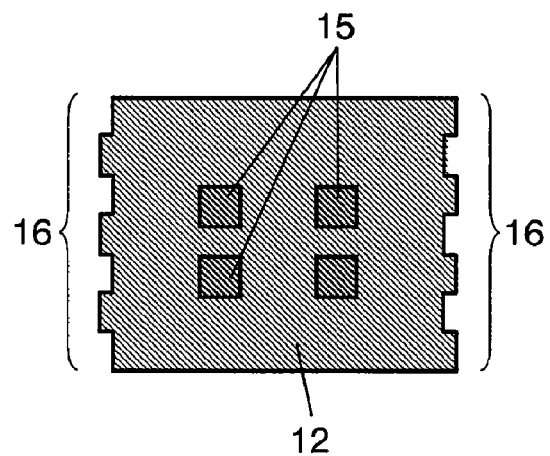
FIG. 4C is a section view taken along arrow 14b in FIG. 4A.

FIGS. 4A through 4C are a perspective view and section views showing an electronic component (formed into a coil shape) of the first exemplary embodiment. FIG. 4A is a perspective view showing an example of the electronic component of the embodiment. Bumps 16 and irregularities 17 formed on a side surface are shown by dotted lines 13.

FIG. 4B and FIG. 4C show sections taken along arrow 14a and arrow 14b, respectively, in FIG. 4A. FIG. 4B shows that internal electrode 15 is formed in resin section 12 so as to be a coil- or helical-shape and each end of internal electrode 15 is integrally formed with external electrodes 11. FIG. 4C shows that bumps 16 are formed on a side surface of resin section 12 that covers internal electrode 15 therein. Instead of bumps 16, the side surface may have irregularities 17 or a combined structure of bumps 16 and irregularities 17.

Forming uneven structure, such as bumps 16, selectively on a surface allows an individual component to be hard-to-cling with one another. At the same time, as is shown in FIG. 4C, forming no bumps 16 on at least one surface in the rest surfaces allows a mounting device to have an improved vacuum suction force. With the structure above, the surface to be processed by vacuum chuck is determined in all the surfaces of a component, by which positioning or mounting direction of the component—even when it is extremely scaled down—can be uniquely defined.

Although bumps 16 and irregularities 17 shown in FIGS. 2 through 3 and FIG. 4C have a squared shape, they are not limited thereto; bumps and irregularities formed into cones or triangular pyramids are also effective. Employing photoresist for resin section 12 can extend the range of selection, which will be discussed in detail in the second exemplary embodiment.

Second Exemplary Embodiment

Hereinafter will be described a method for manufacturing the electronic component shown in the previous embodiment with reference to drawings.

Each of FIGS. 5A through 8C is a section view showing a stage of a method for manufacturing an electronic component. FIGS. 5A through 5E show section views illustrating a procedure of forming a predetermined pattern on a substrate.

Figure 5A:
FIG. 5A is a section view indicative of manufacturing process 1 of a method for manufacturing an electronic component in accordance with a second exemplary embodiment.
Figure 5B:
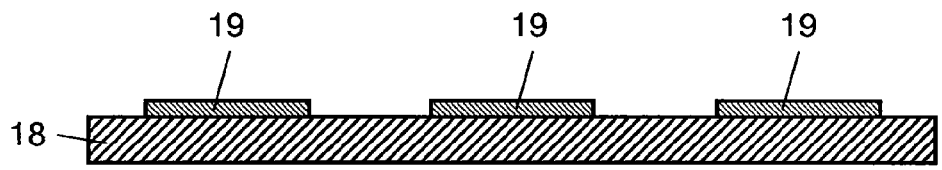
FIG. 5B is a section view indicative of manufacturing process 2 of the method for manufacturing the electronic component in accordance with the second exemplary embodiment.

FIG. 5A shows substrate 18. Preferably, substrate 18 should be a material having excellent flatness, such as a plate of ceramic or metal and a silicon wafer. FIG. 5B shows the next step where a photoresist pattern 19 is formed on substrate 18. Negative photoresists, which insolubilize on exposure to light, can be employed for resist pattern 19. Compared to positive photoresists, negative photoresists offer higher strength and reliability as a resin material. A conventionally used exposure device and chrome mask are used here. The thickness per layer of photoresist pattern 19 should range from 5 µm to 50 µm; preferably, from 10 µm to 40 µm. When resist pattern 19 needs to have a multi-layered structure to obtain a required thickness of the component, the one-layer thickness smaller than 5 µm increases the production cost. On the other hand, if the one-layer thickness is greater than 50 µm, it is often difficult to carry out minute pattern printing under the influence of scattered light or diffracted light during exposure to light. The thickness of bumps 16 and irregularities 17 (FIGS. 2 and 3) is determined so as to agree with the aforementioned preferable range of thickness.

Figure 5C:
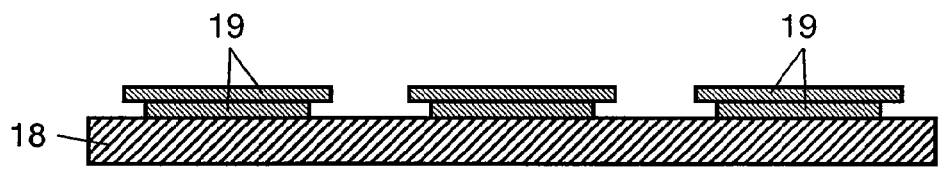
FIG. 5C is a section view indicative of manufacturing process 3 of the method for manufacturing the electronic component in accordance with the second exemplary embodiment.
Figure 5D:
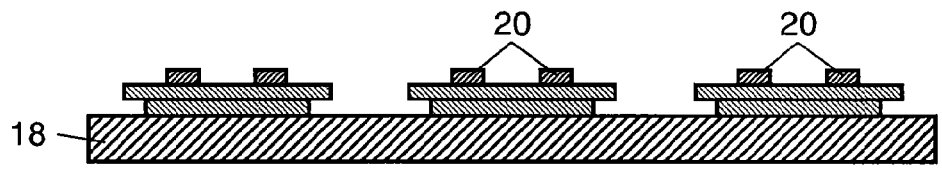
FIG. 5D is a section view indicative of manufacturing process 4 of the method for manufacturing the electronic component in accordance with the second exemplary embodiment.
Figure 5E:
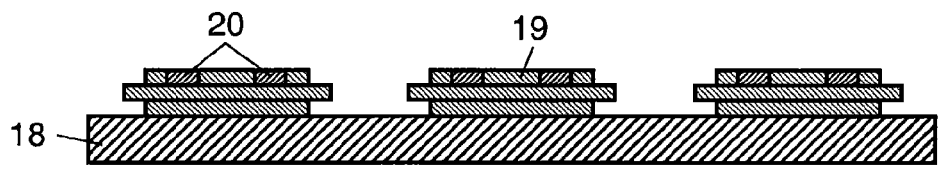
FIG. 5E is a section view indicative of manufacturing process 5 of the method for manufacturing the electronic component in accordance with the second exemplary embodiment.
Figure 6A:
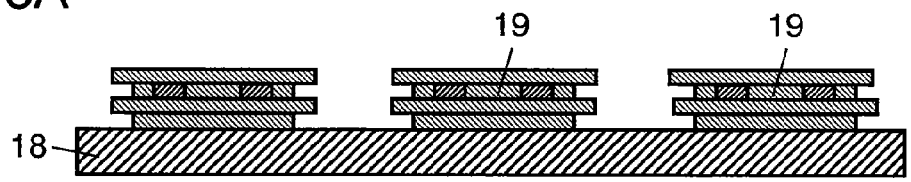
FIG. 6A is a section view indicative of laminating process 1 of the manufacturing method.
Figure 6B:
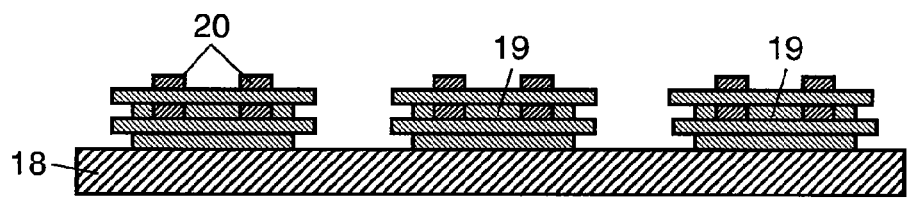
FIG. 6B is a section view indicative of laminating process 2 of the manufacturing method.
Figure 6C:
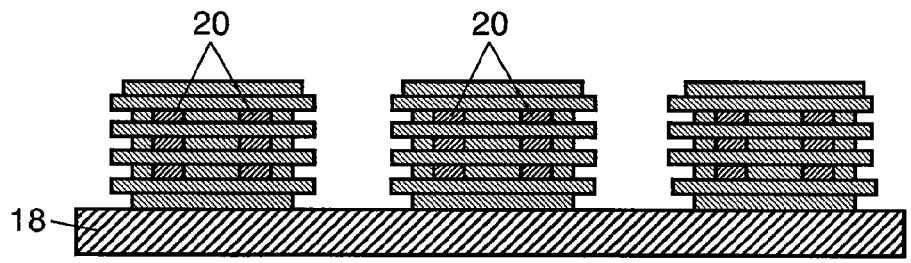
FIG. 6C is a section view indicative of laminating process 3 of the manufacturing method.
Figure 6D:
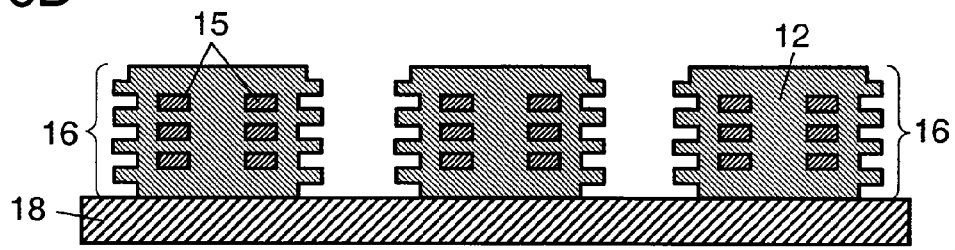
FIG. 6D is a section view indicative of the curing process of the manufacturing method.
Figure 6E:
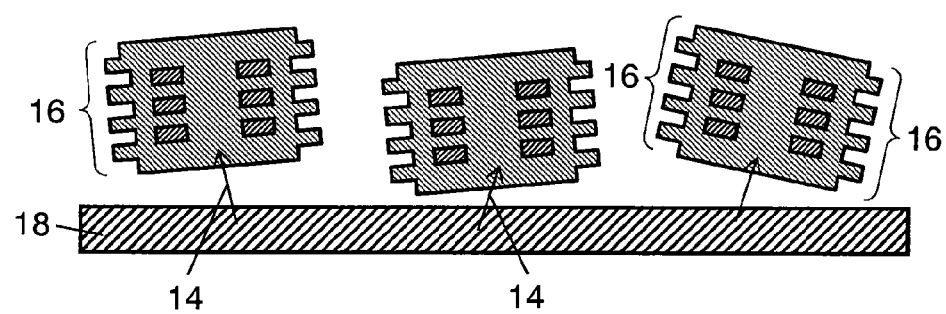
FIG. 6E is a section view indicative of the separating process of the manufacturing method.
Figure 7A:
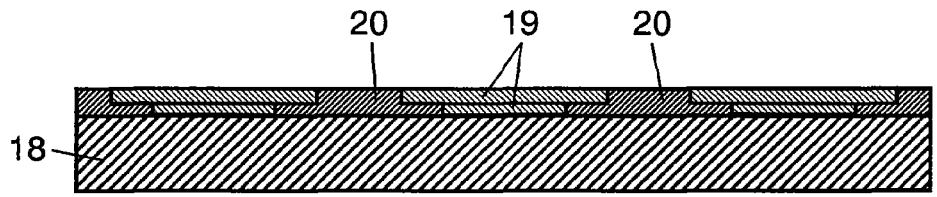
FIG. 7A is a section view indicative of manufacturing process 1, seen from a different direction, of the method for manufacturing the electronic component in accordance with the second exemplary embodiment.
Figure 7B:
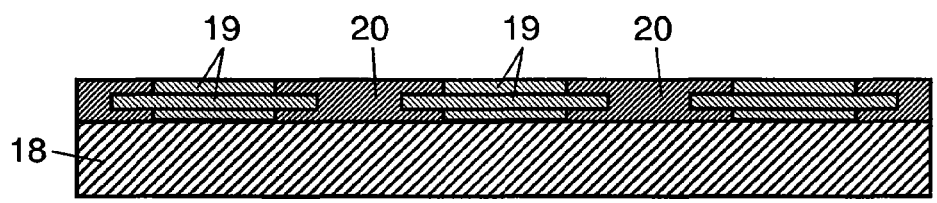
FIG. 7B is a section view indicative of manufacturing process 2, seen from a different direction, of the method for manufacturing the electronic component in accordance with the second exemplary embodiment.
Figure 7C:
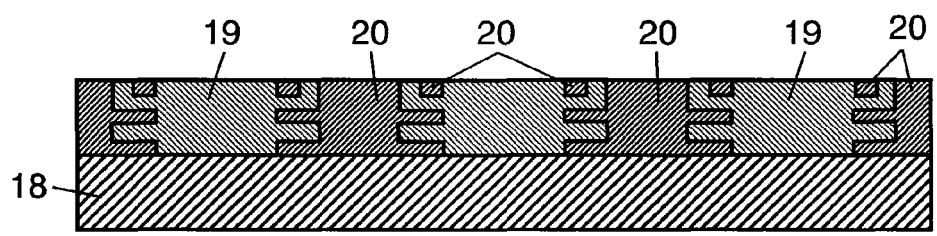
FIG. 7C is a section view indicative of manufacturing process 3, seen from a different direction, of the method for manufacturing the electronic component in accordance with the second exemplary embodiment.
Figure 7D:
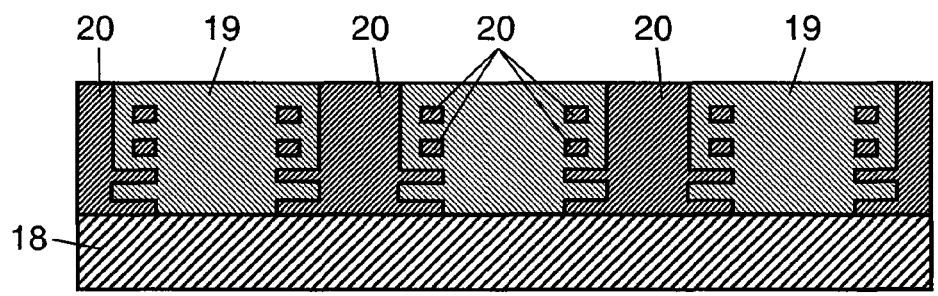
FIG. 7D is a section view indicative of manufacturing process 4, seen from a different direction, of the method for manufacturing the electronic component in accordance with the second exemplary embodiment.

FIGS. 5B and 5C illustrate the multi-layering steps or photoresist pattern 19. Controlling exposure conditions allows photoresist pattern 19 to have an "overhung" structure, as is shown in FIG. 5C. Although a droop or an amount of deviation from perfect alignment is sometimes found in the overhung portion, it can function as bumps 16 and irregularities 17. In the next step, electrode pattern 20 is formed by electro-plating, as is shown in FIG. 5D. With the use of electro-plating, internal electrode 15 has a preferable thickness, for example, ranging from 10 µm to 50 µm. As is shown in FIG. 5E, electrode pattern 20 may be formed in a groove of photoresist pattern 19, for example, by Damascene method. The laminating process of photoresist pattern 19 and electrode pattern 20 is repeated a required number of times. The section views of FIGS. 6A through 6E illustrate the laminating process where electrode pattern 20 is embedded in photoresist pattern 19. Photoresist pattern 19 and electrode pattern 20 are laminated a required number of times (FIG. 6A-FIG. 6C) and then photoresist pattern 19 undergoes a thermosetting process to have a single-piece structure as resin section 12 (FIG. 6D). After that, each of resin section 12 is separated from substrate 18 (as is shown by arrow 14 in FIG. 6E). Such produced electronic component, by virtue of bumps 16 formed on a side surface, is hard-to-cling with one another.

FIGS. 7A through 8C are section views in a different direction (from which bumps 16 are not seen). With reference to the drawings, the manufacturing process will be described.

Figure 8A:
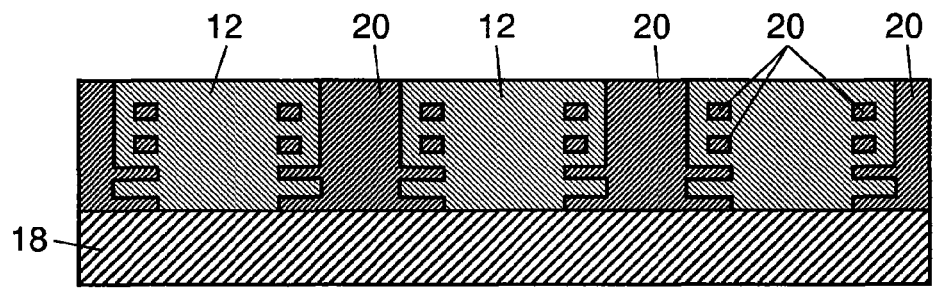
FIG. 8A is a section view indicative of separating process 1, seen from a different direction, of the method for manufacturing the electronic component in accordance with the second exemplary embodiment.
Figure 8B:
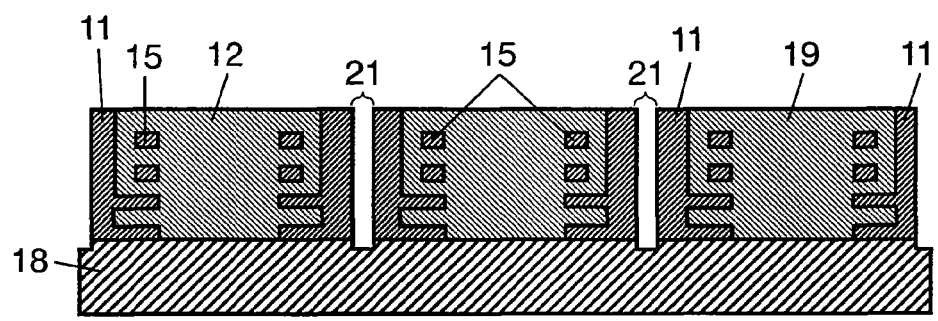
FIG. 8B is a section view indicative of separating process 2, seen from a different direction, of the method for manufacturing the electronic component in accordance with the second exemplary embodiment.
Figure 8C:
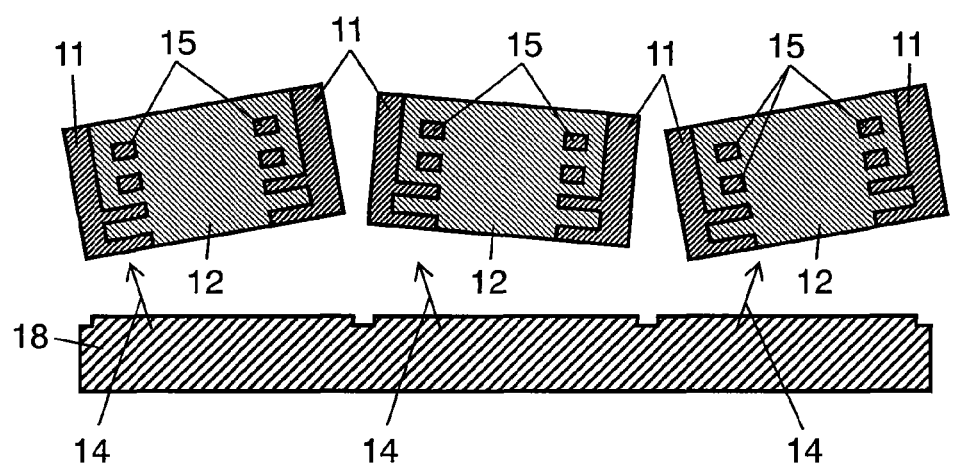
FIG. 8C is a section view indicative of separating process 3, seen from a different direction, of the method for manufacturing the electronic component in accordance with the second exemplary embodiment.
Figure 9:
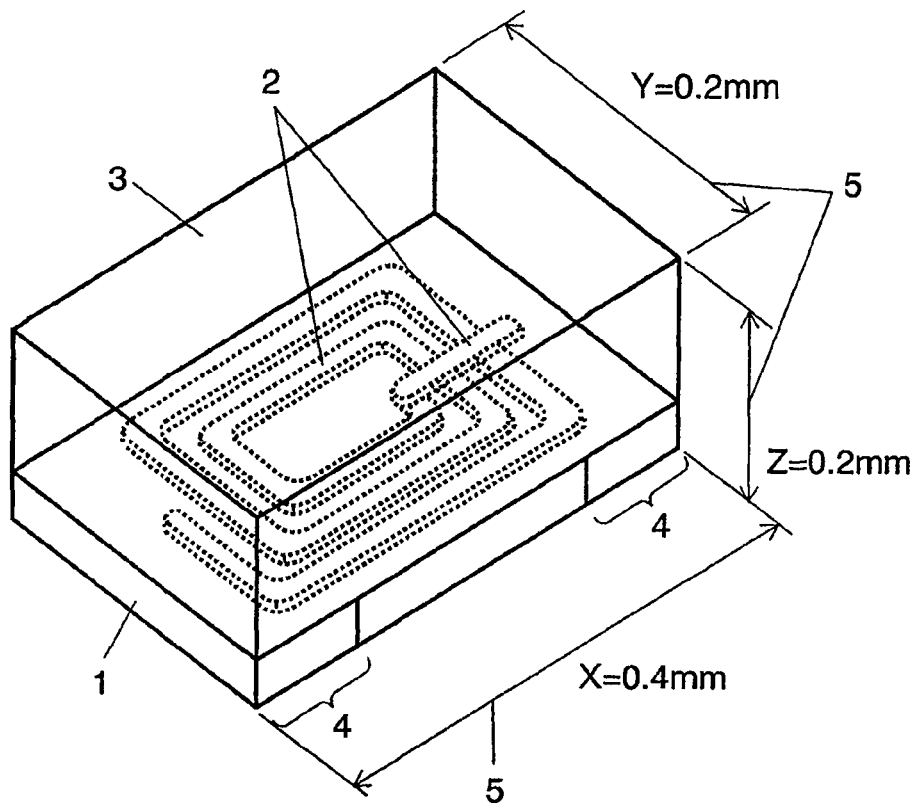
FIG. 9 is a perspective view of a conventional flat coil.
Figure 10:
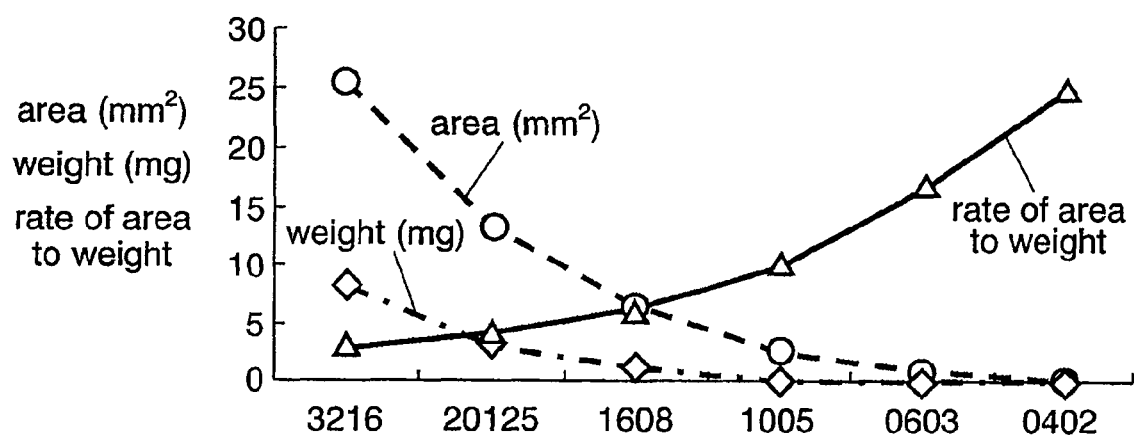
FIG. 10 shows the relationship of the dimension of a conventional electronic component, the area, the weight and the ratio of the area to the weight.

FIGS. 7A through 7D are section views illustrating the laminating process of photoresist pattern 19 and metallic pattern 20 on substrate 18. FIGS. 8A through 8C are section views illustrating the separating process of the laminated structure from substrate 18.

In the process shown in FIG. 8B, gaps 21 are provided with the use of a dicing cutter or the like in the laminated structure that has been formed through the processes shown in FIGS. 7A through 7D, and then each piece is separated from substrate 18, as is shown in FIG. 8C. After that, external electrodes 11 are formed on each piece.

According to the process above, enormous amounts (i.e., from few thousands to several hundreds of thousands) of electronic components are formed on substrate 18 at one time, whereby productivity is highly increased. In the process of separating components from the substrate (FIG. 6E), an improved handleability brought by easy separation also contributes to increase in productivity.

As is described above, the electronic component of the present invention has a plurality of external electrodes 11, resin section 12 that is made of a photoresist or photoresist pattern 19 and is disposed between external electrodes 11, and internal electrode 15 embedded in resin section 12. Resin section 12 has a plurality of bumps 16 on one surface or confronting two surfaces of resin section 12. Bumps 16 have a height ranging from 1 µm to 10 µm. Having the structure above, the electronic component offers excellent handleability even when it is extremely downsized. The "height" described here refers to the length of a protruded portion of bumps 16, i.e., the height from the bottom to the top. The height refers to the length of a laterally protruded portion shown in FIG. 6D.

As another aspect of the present invention, the electronic component has a plurality of external electrodes 11, resin section 12 that is made of a photoresist or photoresist pattern 19 and is disposed between external electrodes 11, and internal electrode 15 embedded in resin section 12. Resin section 12 has a plurality of irregularities 17 on one surface or confronting two surfaces of resin section 12. Irregularities 17 have a height ranging from 1 µm to 10 µm. Having the structure above, the electronic component offers excellent handleability even when it is extremely downsized.

Internal electrode 15 should preferably be made of copper. Forming copper-made internal electrode 15 into a coil pattern allows the electronic component to function as a coil. Such structured coil offer improved Q-factor.

As is shown in FIGS. 6A through 8C, the process of forming photoresist pattern 19 and the process of forming metallic pattern 20 of internal electrode 15 are repeated a required number of times on substrate 18. Through the process above, the electronic component is formed as a laminated structure in which resin section 12 has a plurality of bumps 16 having a height ranging from 1 µm to 10 µm on one surface or confronting two surfaces. The manufacturing method of the present invention allows bumps 16 and irregularities 17 to be formed with high accuracy even when the component are extremely downsized, encouraging stable supply of electronic components with excellent handleability.

The electronic component and the manufacturing method of the present invention, as described above, offers a low-profiled, compact structure with excellent handleability, contributing to production of a compact but powerful electronic devices.

What is claimed is:
1. An electronic component comprising:
   an external electrode;
   a resin section that is made of resin and contacts with the external electrode; and an internal electrode covered with the resin section, wherein a bump, which is made of the resin, has a height ranging from 1 μm to 10 μm inclusive and has a thickness ranging from 5 μm to 50 μm inclusive, is formed on one surface or two-or-more surfaces of at least the resin section.

2. An electronic component comprising:

an external electrode;

a resin section that is made of resin and contacts with the external electrode; and an internal electrode covered with the resin section, wherein, irregularities made of the resin and with a height ranging from 1 μm to 10 μm inclusive are formed on one surface or two-or-more surfaces of at least the resin section.

3. The electronic component of claim 1 or claim 2, wherein the internal electrode is made of copper and is formed into a coil pattern.

4. The electronic component of claim 1, wherein:

the resin section has four surfaces, the bump is formed on two surfaces of the resin section, and other two surfaces of the resin section are flat without the bump.

5. The electronic component of claim 4, wherein:

the two surfaces on which the bump is formed are opposite each other, and the two flat surfaces are opposite each other.

6. The electronic component of claim 1, wherein the resin comprises photoresist.

7. The electronic component of claim 2, wherein:

the resin section has four surfaces, the irregularities are is formed on two surfaces of the resin section, and other two surfaces of the resin section are flat without the irregularities.

8. The electronic component of claim 7, wherein:

the two surfaces on which the irregularities are formed are opposite each other, and the two flat surfaces are opposite each other.

9. The electronic component of claim 2, wherein the resin comprises photoresist.

10. A method for manufacturing an electronic component comprising:

forming a predetermined pattern made of photoresist on a substrate; and forming an internal electrode on the substrate or on the photoresist-made pattern so as to have a predetermined pattern, wherein a plurality of bumps with a height ranging from 1 μm to 10 μm inclusive are formed on one surface or two-or-more surfaces of resin section made of the photoresist while said forming steps are repeated a plurality number of times.

* * * * *